(12) United States Patent
Woo et al.

(10) Patent No.: US 12,565,260 B2
(45) Date of Patent: Mar. 3, 2026

(54) DRIVER EVASIVE STEERING INTENT DETECTION IN VEHICLES

(71) Applicant: GM GLOBAL TECHNOLOGY OPERATIONS LLC, Detroit, MI (US)

(72) Inventors: Ami Woo, Calgary (CA); Mohammadali Shahriari, Markham (CA); Khizar Ahmad Qureshi, Pickering (CA); Reza Zarringhalam, Whitby (CA); Hassan Askari, Thornhill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 18/491,189

(22) Filed: Oct. 20, 2023

(65) Prior Publication Data

US 2025/0128757 A1 Apr. 24, 2025

(51) Int. Cl.
B62D 5/04 (2006.01)
B62D 6/10 (2006.01)

(52) U.S. Cl.
CPC ............. B62D 5/0463 (2013.01); B62D 6/10 (2013.01)

(58) Field of Classification Search
CPC ......... B62D 5/0463; B62D 6/10; B62D 6/00; B62D 15/0265; B62D 15/025; B60W 10/20; B60W 30/08; B60W 30/09; B60W 30/02; B60W 2050/0068
USPC ........................................................ 701/41
See application file for complete search history.

(56) References Cited

U.S. PATENT DOCUMENTS

| | | | | |
|---|---|---|---|---|
| 7,124,027 B1 * | 10/2006 | Ernst, Jr. ............... | B60W 30/09 | 701/301 |
| 7,765,066 B2 * | 7/2010 | Braeuchle ........... | B60W 30/095 | 701/41 |
| 2014/0067252 A1 * | 3/2014 | Knoop ................... | G08G 1/167 | 701/400 |
| 2016/0339910 A1 * | 11/2016 | Jonasson ............... | B60W 10/20 | |
| 2019/0351899 A1 * | 11/2019 | Adam ................... | B60W 30/09 | |

(Continued)

FOREIGN PATENT DOCUMENTS

| | | | | |
|---|---|---|---|---|
| DE | 102004059002 A1 * | 6/2006 | ............... | B60T 7/22 |
| DE | 102009003203 A1 * | 11/2010 | ......... | B62D 15/0265 |
| DE | 102014206344 A1 * | 10/2015 | ........... | B60W 30/09 |

OTHER PUBLICATIONS

Office Action issued Jun. 18, 2024 in German Application No. 10 2023 135 676.3; 7pgs.

*Primary Examiner* — Kurt Philip Liethen
*Assistant Examiner* — Anthony Donald Taylor, Jr.

(57) ABSTRACT

A vehicle system includes a control module configured to receive data from a sensor indicative of a torque applied to the steering wheel, calculate a torque rate based on the applied torque, calculate a left evasive steering probability of the driver intending to steer the vehicle to the left and a right evasive steering probability of the driver intending to steer the vehicle to the right based on the torque, the torque rate, and a modeled relationship between the torque and the torque rate, compare the left evasive steering probability and the right evasive steering probability to determine a directional steering intent of the driver, and transmit a signal to a threat avoidance steering control module for controlling the vehicle. Other example vehicle systems and methods for predicting driver intent in evasive steering maneuvers are also disclosed.

20 Claims, 7 Drawing Sheets

(56) References Cited

U.S. PATENT DOCUMENTS

| | | | | |
|---|---|---|---|---|
| 2020/0086854 A1* | 3/2020 | Liu | .................. | B60W 30/0956 |
| 2020/0241530 A1* | 7/2020 | Caveney | .......... | B60W 60/0016 |
| 2023/0099555 A1* | 3/2023 | Zhang | .................. | B60W 50/00 |
| | | | | 701/41 |

* cited by examiner

600 ⤳

DRIVER EVASIVE STEERING INTENT DETECTION IN VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to driver evasive steering intent detection in vehicles.

A vehicle often includes a driver assistance system. For example, the driver assistance system may include assisted evasive steering, blind spot detection, adaptive cruise control, lane departure warnings, etc. The assisted evasive steering is a driver-initiated collision avoidance steering mechanism. When the assisted evasive steering is employed and the driver begins to steer the vehicle around an object (e.g., another vehicle), the system applies additional steering torque to assist the vehicle around the object. In some cases, the system applies steering torque in the opposite direction after the vehicle passes the object. In such examples, the application of the assisted evasive steering is controlled based on vehicle dynamics (e.g., changes in the forward movement of the vehicle in response to driver inputs).

SUMMARY

A vehicle system for predicting driver intent in evasive steering maneuvers includes a sensor configured to monitor torque associated with a steering wheel in a vehicle, and a control module in communication with the sensor. The control module is configured to receive data from the sensor indicative of a torque applied to the steering wheel while the vehicle is moving, calculate a torque rate based on the applied torque, calculate a left evasive steering probability of the driver intending to steer the vehicle to the left and a right evasive steering probability of the driver intending to steer the vehicle to the right based on the torque, the torque rate, and a modeled relationship between the torque and the torque rate, compare the calculated left evasive steering probability and the calculated right evasive steering probability to determine a directional steering intent of the driver, and transmit a signal to a threat avoidance steering control module for controlling the vehicle. The signal indicates the directional steering intent of the driver.

In other features, the modeled relationship is a rotated ellipse.

In other features, the control module is configured to determine a torque offset for the modeled relationship to center the rotated ellipse at a defined point.

In other features, the control module is configured to calculate a variance of the torque and in response to the variance being less than or equal to a defined threshold, set the torque offset to a learned value.

In other features, the control module is configured to calculate a variance of the torque and in response to the variance being greater than a defined threshold, set the torque offset to zero.

In other features, the control module is configured to transmit the signal to the threat avoidance steering control module indicating the steering intent of the driver is to the left in response to the left evasive steering probability being greater than the right evasive steering probability.

In other features, the control module is configured to transmit the signal to the threat avoidance steering control module indicating the steering intent of the driver is to the right in response to the right evasive steering probability being greater than the left evasive steering probability.

In other features, the left evasive steering probability and the right evasive steering probability are based on weighted averages of the torque and the torque rate.

In other features, the control module is configured to assign a confidence level for the directional steering intent of the driver based on one or more defined thresholds.

In other features, the control module is configured to transmit the signal to the threat avoidance steering control module indicating the assigned confidence level to the directional steering intent of the driver.

In other features, a vehicle includes the vehicle system and the threat avoidance steering control module in communication with the control module.

A method for predicting driver intent in evasive steering maneuvers in a vehicle includes receiving data indicative of a torque applied to a steering wheel in the vehicle while the vehicle is moving, calculating a torque rate based on the applied torque, calculating a left evasive steering probability of the driver intending to steer the vehicle to the left and a right evasive steering probability of the driver intending to steer the vehicle to the right based on the torque, the torque rate, and a modeled relationship between the torque and the torque rate, comparing the calculated left evasive steering probability and the calculated right evasive steering probability to determine a directional steering intent of the driver, and transmitting a signal to a threat avoidance steering control module for controlling the vehicle. The signal indicates the directional steering intent of the driver.

In other features, the modeled relationship is a rotated ellipse and the method further includes determining a torque offset for the modeled relationship to center the rotated ellipse at a defined point.

In other features, the method further includes calculating a variance of the torque and in response to the variance being less than or equal to a defined threshold, setting the torque offset to a learned value.

In other features, the method further includes calculating a variance of the torque and in response to the variance being greater than a defined threshold, setting the torque offset to zero.

In other features, transmitting the signal to the threat avoidance steering control module includes transmitting the signal to the threat avoidance steering control module indicating the steering intent of the driver is to the left in response to the left evasive steering probability being greater than the right evasive steering probability.

In other features, transmitting the signal to the threat avoidance steering control module includes transmitting the signal to the threat avoidance steering control module indicating the steering intent of the driver is to the right in response to the right evasive steering probability being greater than the left evasive steering probability.

In other features, the left evasive steering probability and the right evasive steering probability are based on weighted averages of the torque and the torque rate.

In other features, the method further includes assigning a confidence level for the directional steering intent of the driver based on the left evasive steering probability or the right evasive steering probability and one or more defined thresholds.

In other features, transmitting the signal to the threat avoidance steering control module includes transmitting the signal to the threat avoidance steering control module indicating the assigned confidence level to the directional steering intent of the driver.

A vehicle system for predicting driver intent in evasive steering maneuvers includes a sensor configured to monitor torque associated with a steering wheel in a vehicle, and a control module in communication with the sensor. The control module is configured to receive data from the sensor indicative of a torque applied to the steering wheel while the vehicle is moving, calculate a torque rate based on the applied torque, calculate a left evasive steering probability of the driver intending to steer the vehicle to the left and a right evasive steering probability of the driver intending to steer the vehicle to the right based on the torque, the torque rate, and a modeled relationship between the torque and the torque rate, compare the left evasive steering probability and the right evasive steering probability to determine a directional steering intent of the driver, assign a confidence level for the directional steering intent of the driver based on the left evasive steering probability or the right evasive steering probability and one or more defined thresholds, and transmit a signal to a threat avoidance steering control module for controlling the vehicle, the signal indicating the directional steering intent of the driver and the corresponding confidence level.

In other features, transmitting the modeled relationship is a rotated ellipse, and the control module is configured to determine a torque offset for the modeled relationship to center the rotated ellipse at a defined point.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may implement threat avoidance steering (e.g., assisted evasive steering (AES), etc.) for assisting a driver to steer around an object, such as another vehicle on the road. In such examples, the threat avoidance steering is a driver-initiated collision avoidance steering mechanism that applies additional steering torque to assist the vehicle around the object. This helps the driver reach a maximum steering angle more quickly and therefore avoid a collision with the object. The threat avoidance steering is conventionally activated based on vehicle dynamics (e.g., changes in the forward movement of the vehicle in response to driver inputs). However, because such vehicle dynamic based activation is reactive to movement of the vehicle, assistive steering control with the threat avoidance steering may be delayed. Such delays (although possibly slight) in activation may lead to a collision between the vehicle and the object on the road. Additionally, the conventional threat avoidance steering may not adequately detect movement of the vehicle due to driver-initiated collision avoidance steering in some conditions, such as when the driver is also steering the vehicle around a curve in the road.

The vehicle systems according to the present disclosure enable the proactive detection of driver intent and in a predictive fashion to ensure the threat avoidance steering is activated and engaged to avoid collisions. For example, the vehicle systems monitor driver applied torque and vehicle states and in a probabilistic fashion to effectively detect the intent of the driver for an evasive maneuver. Then, the vehicle systems accurately predict the evasive steer by the driver at the beginning of the maneuver through mathematical holistic modeling of the driver's intent in the torque domain. Such technical solutions enable a robust detection and predication of the driver-initiated evasive steering that is effective in all vehicle maneuvers (e.g., straight and curve maneuvers). As a result, the vehicle systems herein may accurately detect and predict the driver's intent in an evasive maneuver quicker (e.g., at least 400 msec faster) than the conventional dynamics-based threat avoidance steering systems and in curves, which are often missed with the conventional dynamics-based threat avoidance steering systems.

Figure 1:
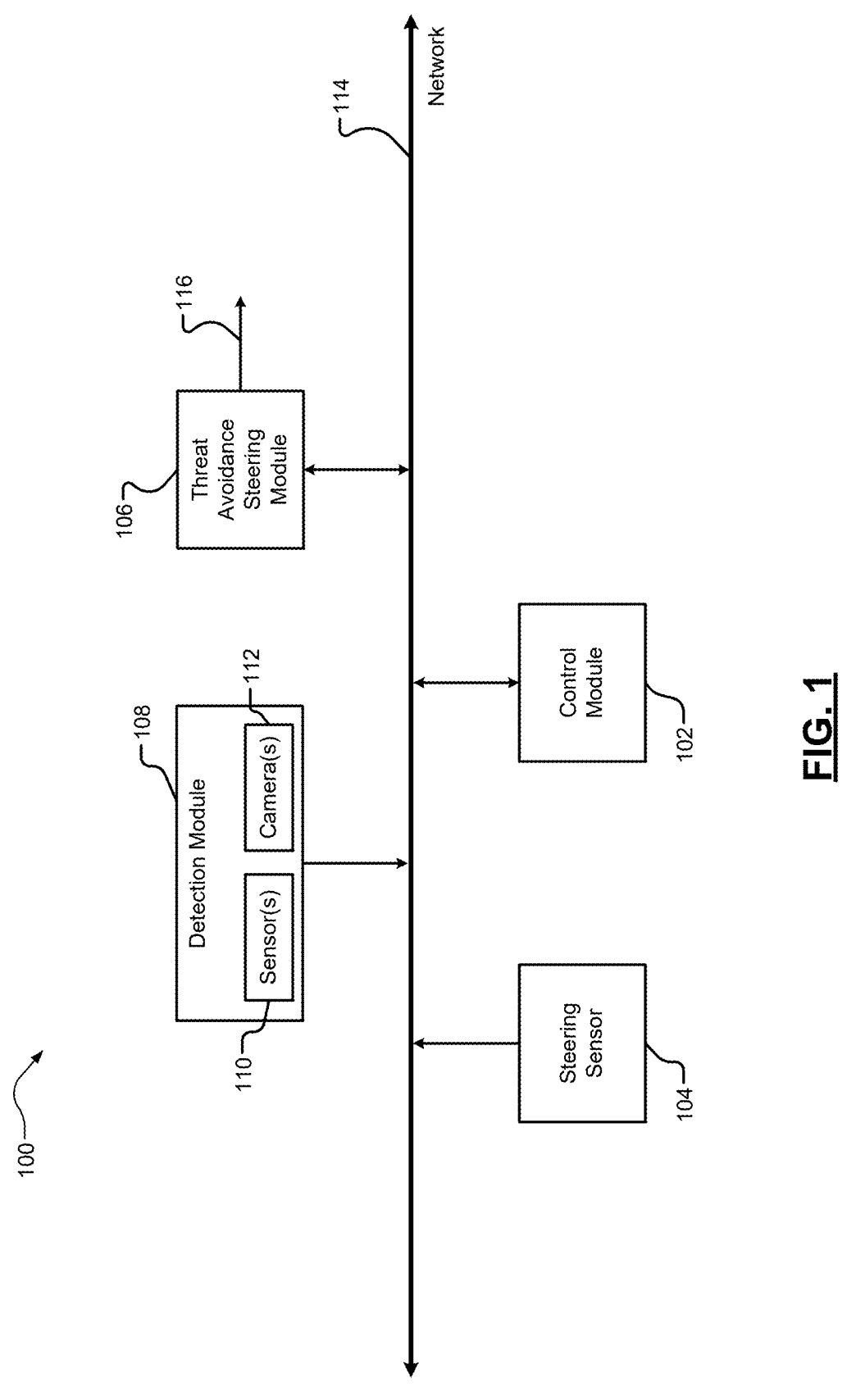
FIG. 1 is a functional block diagram of an example vehicle system for detecting and predicting driver intent in evasive steering maneuvers in a moving vehicle, according to the present disclosure.

Referring now to FIG. 1, a block diagram of an example vehicle system 100 is presented for detecting and predicting driver intent in evasive steering maneuvers in a moving vehicle. As shown in FIG. 1, the vehicle system 100 generally includes a control module 102 and a steering sensor 104 in communication with the control module 102. Additionally, the vehicle system 100 may optionally include an threat avoidance steering control module 106 in communication with the control module 102, and a detection module 108 in communication with the control module 102 and/or the threat avoidance steering control module 106.

In various embodiments, the modules and sensors of the vehicle system 100 may share parameters via a network 114, such as a controller (or car) area network (CAN). In such examples, the parameters may be shared via one or more data buses of the network 114. As such, various parameters may be made available by a given module and/or sensor to other modules and/or sensors via the network 114.

Figure 2:
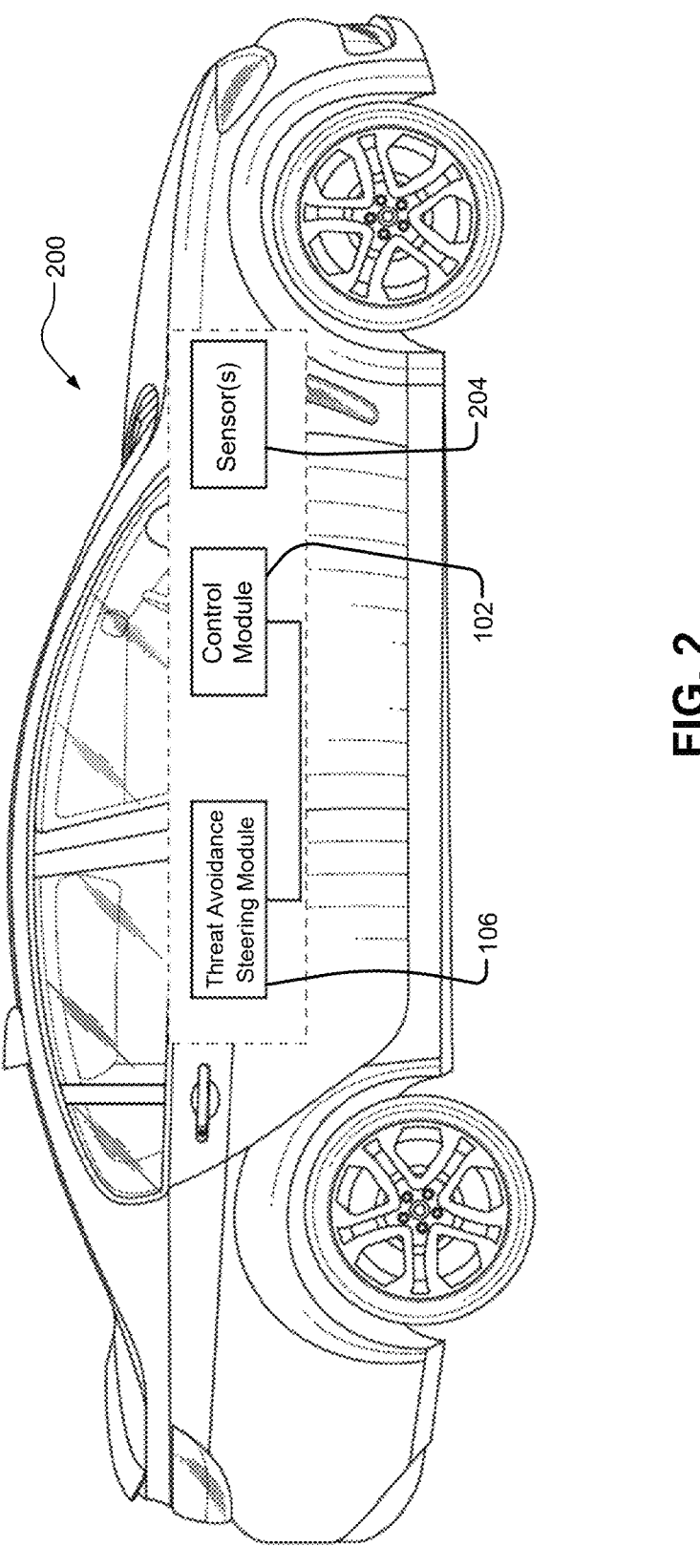
FIG. 2 is a vehicle including portions of the vehicle system of FIG. 1, according to the present disclosure.

The vehicle system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the system 100 may be applicable to an autonomous vehicle, a semi-autonomous vehicle, etc. For example, FIG. 2 depicts a vehicle 200 including the control module 102 and the threat avoidance steering control module 106 of FIG. 1, and one or more sensors 204 (e.g., the steering sensor 104 of FIG. 1, etc.) in communication with the control module 102 and/or the threat avoidance steering control module 106.

With continued reference to FIG. 1, the steering sensor 104 generally monitors a torque associated with a steering wheel in the vehicle. For example, the steering sensor 104 may monitor or otherwise sense a torque applied by a driver to the steering wheel when the driver is steering (e.g., evasive steering) the vehicle in a left or right direction. The steering sensor 104 may then transmit the torque (or a representation thereof) to the control module 102 via the network 114. This monitoring and transmission may occur repeatedly, such as periodically, to provide the control module 102 multiple values of the torque over time. In such examples, the steering sensor 104 may be any suitable torque sensing device.

The detection module 108 may generally receive data relating to components in the vehicle and/or the environment external to the vehicle. For example, the detection module 108 may collect data indicative of detected objects, road conditions, weather conditions, braking, etc. for use in controlling various driver assistance systems (e.g., a threat avoidance steering system, etc.). In various embodiments, the detection module 108 may transmit data indicative of detected objects, road conditions, weather conditions, etc. to the threat avoidance steering control module 106 via the network 114 for controlling vehicle steering, as further explained herein.

In various embodiments, the detection module 108 may include one or more detection devices. For example, the detection module 108 may include one or more sensors 110 and/or cameras 112 mounted on the exterior and/or interior of the vehicle. In such examples, the sensors may include any suitable type of sensor, such as radar sensors, lidar sensors, ultrasonic sensors, 3D sensors, etc. The sensors may be short-range sensors (e.g., short range radar (SRR) sensors, etc.) and/or long-range sensors (e.g., radar (LRR) sensors, etc.). In some examples, the cameras may include a front view camera, a left view camera, and a right view camera (relative to the vehicle).

The example of FIG. 1, the control module 102 receives torque data from the steering sensor 104 indicating movement of the steering wheel. For example, the control module 102 may receive multiple values (or representations thereof) over time indicative of the torque applied to the steering wheel while the vehicle is moving. In various embodiments, the control module 102 may receive torque related values periodically. Once received, the control module 102 may temporarily store the values (e.g., a present torque value $\tau_i$ and one or more previous torque values $\tau_{i-1}, \tau_{i-2}, \ldots \tau_{i-N}$) in a buffer in or associated with the control module 102 for later use.

Then, the control module 102 may calculate a torque rate based on the received torque applied to the steering wheel. In various embodiments, the control module 102 may determine the torque rate (e.g., a rate in which the torque is changing) by calculating the derivative of the torque.

In various embodiments, the control module 102 may model a relationship to detect the driver's intent protectively. For example, the control module 102 may model a relationship between one or more torque values and corresponding torque rate values during the beginning of maneuvers (e.g., evasive maneuvers to the right or left). In some examples, the relationship can be modeled as rotated ellipse in a torque domain.

Figure 3:
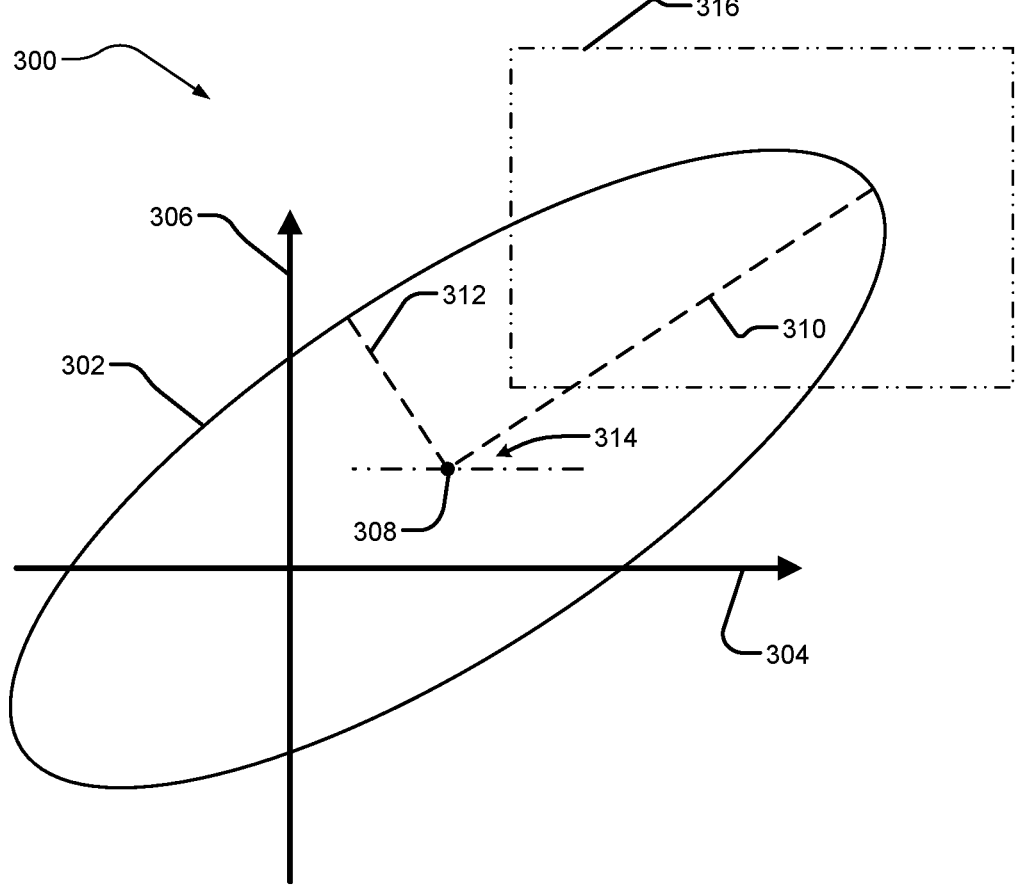
FIG. 3 depicts a graph showing a modeled rotated ellipse in a torque domain having a torque axis and a torque rate axis, according to the present disclosure.

For example, FIG. 3 illustrates a graph 300 showing a rotated ellipse 302 in a torque domain having a torque axis 304 (e.g., an X-axis) and a torque rate axis 306 (e.g., a Y-axis). As shown, the ellipse 302 includes a center 308, a major axis 310, and a minor axis 312. The major axis 310 represents a distance (a) from the center 308 of the ellipse 302 to one vertex of the ellipse 302, and the minor axis 312 represents another shorter distance (b) from the center 308 of the ellipse 302 to another vertex of the ellipse 302. In the example of FIG. 3, the ellipse 302 is rotated by an angle (θ) 314.

The rotated ellipse 302 may be modeled by equation (1) below. As shown in the modeled relationship, $\tau$ represents the torque, $\tau'$ represents the torque rate, h is the center of the ellipse on the torque axis 304, k is the center of the ellipse on the torque rate axis 306, θ (theta) is the rotated angle of the ellipse (e.g., the angle 314), a represents a distance of the major axis 310 (e.g., a length of one radius axis), and b represents a distance of the minor axis 312 (e.g., a length of another radius axis). In various embodiments, a and b of equation (1) may be identified (e.g., learned) values based on analysis of the modeled relationship for straight road evasive maneuvers and curved road evasive maneuvers.

$$\frac{((\tau - h)\cos\theta + (\tau' - k)\sin\theta)^2}{a^2} + \frac{((\tau - h)\sin\theta - (\tau' - k)\cos\theta)^2}{b^2} = 1 \quad (1)$$

In various embodiments, the control module 102 of FIG. 1 may detect whether the driver is making an evasive steering maneuver based on, for example, the torque, torque rate, and the modeled relationship. For instance, if the received torque and the calculated torque rate are significant enough to fall within a threshold range, the control module 102 may detect the evasive steering maneuver. In such examples, the torque and the torque rate may fall (according to the modeled relationship) within an evasive steer detection window 316 of FIG. 3. In the example of FIG. 3, the evasive steer detection window 316 is shown in quadrant one (Q1) of the graph 300. This indicates a detection of a left evasive steer. In other examples, another evasive steer detection window may be realized in quadrant three (Q3) of the graph 300, which indicates a detection of a right evasive steer.

In various embodiments, the modeled rotated ellipse may be biased or offset from the center or origin (0,0) of the torque domain, as shown in FIG. 3. Such scenarios may occur when an evasive maneuver is initiated by the driver on a curve in the road but not when an evasive maneuver is initiated by the driver on a straight portion of the road. As such, the modeled ellipse for straight portions of the road may have a center (h,k) equal to (0,0), whereas the modeled ellipse for curved portions of the road may not be centered at (0,0). In such examples, it may be desirable to adjust the rotated ellipse to the center (0,0) of the torque domain. Such adjustment may be accomplished through the introduction of an induced or offset torque.

Figure 4:
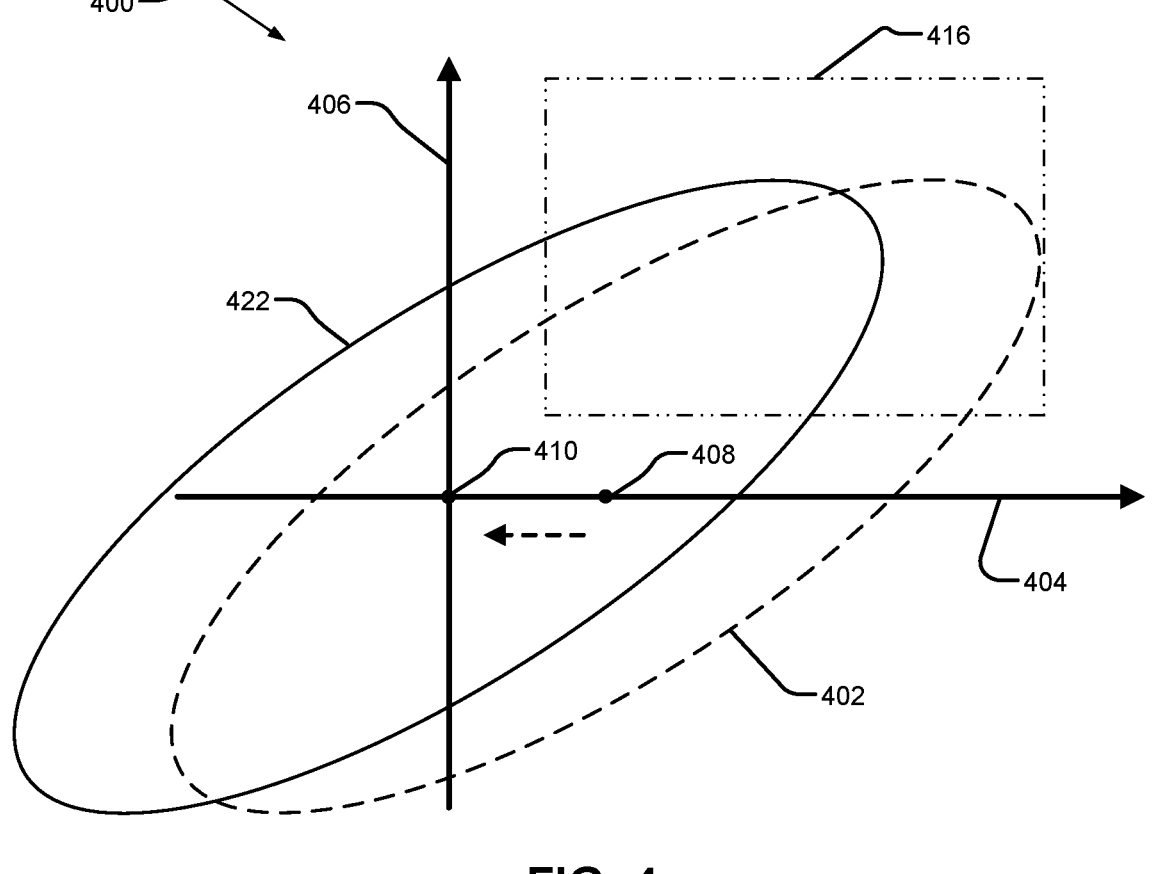
FIG. 4 depicts a graph showing a modeled rotated ellipse in a torque domain having a torque axis and a torque rate axis, where the rotated ellipse is translated to be centered at the origin according to the present disclosure.

In some examples, the modeled rotated ellipse may be biased along only the torque axis (e.g., the torque axis 304 of FIG. 3). In other words, the modeled ellipse may have a center (h,k) equal to (h,0). In such examples, the induced or offset torque may be based on the center of the ellipse along the torque axis (e.g., equal to h). For example, FIG. 4 illustrates a graph 400 showing rotated ellipses 402, 422 and an evasive steer detection window 416 (e.g., similar to the evasive steer detection window 316 of FIG. 3) in a torque domain having a torque axis 404 (e.g., an X-axis) and a torque rate axis 406 (e.g., a Y-axis). As shown, the ellipse 402 (dashed outline) includes a center 408 offset from the center or origin (0,0) of the torque domain. By introducing the offset torque, the ellipse 402 may be translated to the center of the torque domain. The translated ellipse is shown as the rotated ellipse 422 (sold outline) having a center 410 at the origin (0,0) of the torque domain.

The control module 102 can determine the offset torque for the modeled relationship to center the rotated ellipse at a defined point (e.g., at the center of the torque domain). In doing so, the control module 102 can use the same generalized evasive steer detect conditions employed for straight portions of the road (e.g., when the rotated ellipse is already at the center of the torque domain) to detect conditions for curved portions of the road (e.g., when the rotated ellipse is originally not at the center of the torque domain).

In some examples, equation (1) above may be modified for translating the rotated ellipse to be centered around the origin with the offset torque. For example, the modeled rotated ellipse may be biased only along the torque axis, as shown in FIG. 4. In such examples, equation (2) below represents one example of a modification to equation (1). As shown in equation (2), the offset torque (shown by $\tau_{induced}$) is added to offset the value of h. If the offset torque (or induced torque) is equal to h and k equals zero (e.g., the modeled ellipse is not biased away from the origin along the torque rate axis), then equation (2) can be simplified into equation (3) as shown below.

$$\frac{((\tau - h + \tau_{induced})\cos\theta + (\tau' - k)\sin\theta)^2}{a^2} + \tag{2}$$

$$\frac{((\tau - h + \tau_{induced})\sin\theta - (\tau' - k)\cos\theta)^2}{b^2} = 1$$

$$\frac{(\tau\cos\theta + \tau'\sin\theta)^2}{a^2} + \frac{(\tau\sin\theta - \tau'\cos\theta)^2}{b^2} = 1 \tag{3}$$

In various embodiments, the control module 102 determines the offset torque based on various calculations. For example, the control module 102 may calculate a variance ($\sigma^2$) of the applied torque (e.g., received from the steering sensor 104). Equation (4) below shows one manner to calculate the variance based on a set (N) of torque values (the present torque value $\tau_i$ and one or more previous torque values $\tau_{i-1}$, $\tau_{i-2}$, $\tau_{i-3}$, etc.), and more particularly based on the present torque value $\tau_i$ and an average of the set (N) of torque values. In such examples, the torque values received from the steering sensor 104 may be buffered.

$$\text{variance } (\sigma^2) = \frac{1}{N}\sum_{i=1}^{n}(\tau_i - \tau_{avg})^2 \tag{4}$$

Then, the control module 102 may set the offset torque based on the calculated variance ($\sigma^2$). For example, the control module 102 may set the torque offset to zero in response to the variance being greater than a defined threshold. In other examples, the control module 102 may set the torque offset to a learned value in response to the variance being less than or equal to a defined threshold, set the torque offset is a learned value (e.g., a value equal to h). In such examples, the learned value may be obtained in any suitable manner, such as with a filter (e.g., a Stochastic filter, etc.) that averages values over time.

Additionally, the control module 102 calculates evasive steering maneuver probabilities for predicting the intent of the driver. This calculation may be similar for both curved and straight portions of the road due to the translation of the modeled ellipse as explained above. For example, the control module 102 may calculate an evasive steering maneuver probability of the driver intending to steer the vehicle to the left and another evasive steering maneuver probability of the driver intending to steer the vehicle to the right based on the torque, the torque rate, and the modeled relationship. In such examples, the control module 102 may calculate separate left and right evasive steering maneuver probabilities based on torque and separate left and right evasive steering maneuver probabilities based on torque rate. For example, equations (5) and (6) below provide relationships for calculating right and left evasive steering maneuver probabilities. Specifically, equations (5.1) and (5.2) may be employed to calculate right and left evasive steering maneuver probabilities based on torque ($\tau$) whereas equations (6.1) and (6.2) may be employed to calculate right and left evasive steering maneuver probabilities based on torque rate ($\tau'$).

$$P_{right}(\tau) = \frac{1}{1 + e^{\beta_\tau(\tau + \tau_{induced} + \alpha_\tau)}} \tag{5.1}$$

$$P_{left}(\tau) = \frac{1}{1 + e^{-\beta_\tau(\tau + \tau_{induced} - \alpha_\tau)}} \tag{5.2}$$

$$P_{right}(\tau') = \frac{1}{1 + e^{\beta_{\tau'}(\tau' + \alpha_{\tau'})}} \tag{6.1}$$

$$P_{left}(\tau') = \frac{1}{1 + e^{-\beta_{\tau'}(\tau' - \alpha_{\tau'})}} \tag{6.2}$$

In the example of equations (5) and (6), $\beta$ and $\alpha$ represent tuning parameters associated with the torque ($\tau$) or the torque rate ($\tau'$), and $\tau_{induced}$ represents the offset torque. More specifically, $\beta$ represents a sigmoid steepness of the torque ($\tau$) in equation (5) or the torque rate ($\tau'$) in equation (6), and $\alpha$ represents a sigmoid midpoint of the torque ($\tau$) in equation (5) or the torque rate ($\tau'$) in equation (6).

Then, once the left and right evasive steering maneuver probabilities for torque and for torque rate are calculated, the control module 102 separately combines the left evasive steering maneuver probabilities for torque and torque rate and the right evasive steering maneuver probabilities for torque and torque rate, as shown in equations (7.1) and (7.2) below. Once separately combined, the control module 102 can compare the two to determine a directional steering intent. For example, if the combined left evasive steering maneuver probability P(AES_left) is greater than the combined right evasive steering maneuver probability P(AES_right), the control module 102 detects that the intent of the driver is evasive steering to the left. If, however, the combined right evasive steering maneuver probability P(AES_right) is greater than the combined left evasive steering maneuver probability P(AES_left), the control module 102 detects that the intent of the driver is evasive steering to the right.

$$P(\text{AES\_right}) = P_{right}(\tau) + P_{right}(\tau') \tag{7.1}$$

$$P(\text{AES\_left}) = P_{left}(\tau) + P_{left}(\tau') \tag{7.2}$$

In various embodiments, the evasive steering maneuver probabilities may be based on weighted averages of the torque and the torque rate. For example, each evasive steering maneuver probability for torque and torque rate (e.g., calculated by equations (5) and (6) above) may be weighted based on defined values. In some examples, the evasive steering maneuver probability for torque may be multiplied by a defined weight and the evasive steering maneuver probability for torque rate may be multiplied by another defined weight. As one example, equations (8.1) and (8.2) below show the evasive steering maneuver probability $P(\tau)$ for torque being multiplied by a defined weight $(w_\tau)$ and the evasive steering maneuver probability $P(\tau')$ for torque rate being multiplied by a defined weight $(1-w_\tau)$. The weighted evasive steering maneuver probability $P(AES\_w)$ may be calculated for both the right possibility (equation (8.1)) and the left possibility (equation (8.2)). Then, the control module 102 may compare the weighted left evasive steering maneuver probability and the weighted right evasive steering maneuver probability as explained above to determine a directional steering intent.

$$P(AES\_right\_w) = w_\tau \, P_{right}(\tau) + (1 - w_\tau) \, P_{right}(\tau') \qquad (8.1)$$

$$P(AES\_left\_w) = w_\tau \, P_{left}(\tau) + (1 - w_\tau) \, P_{left}(\tau') \qquad (8.2)$$

Figure 5:
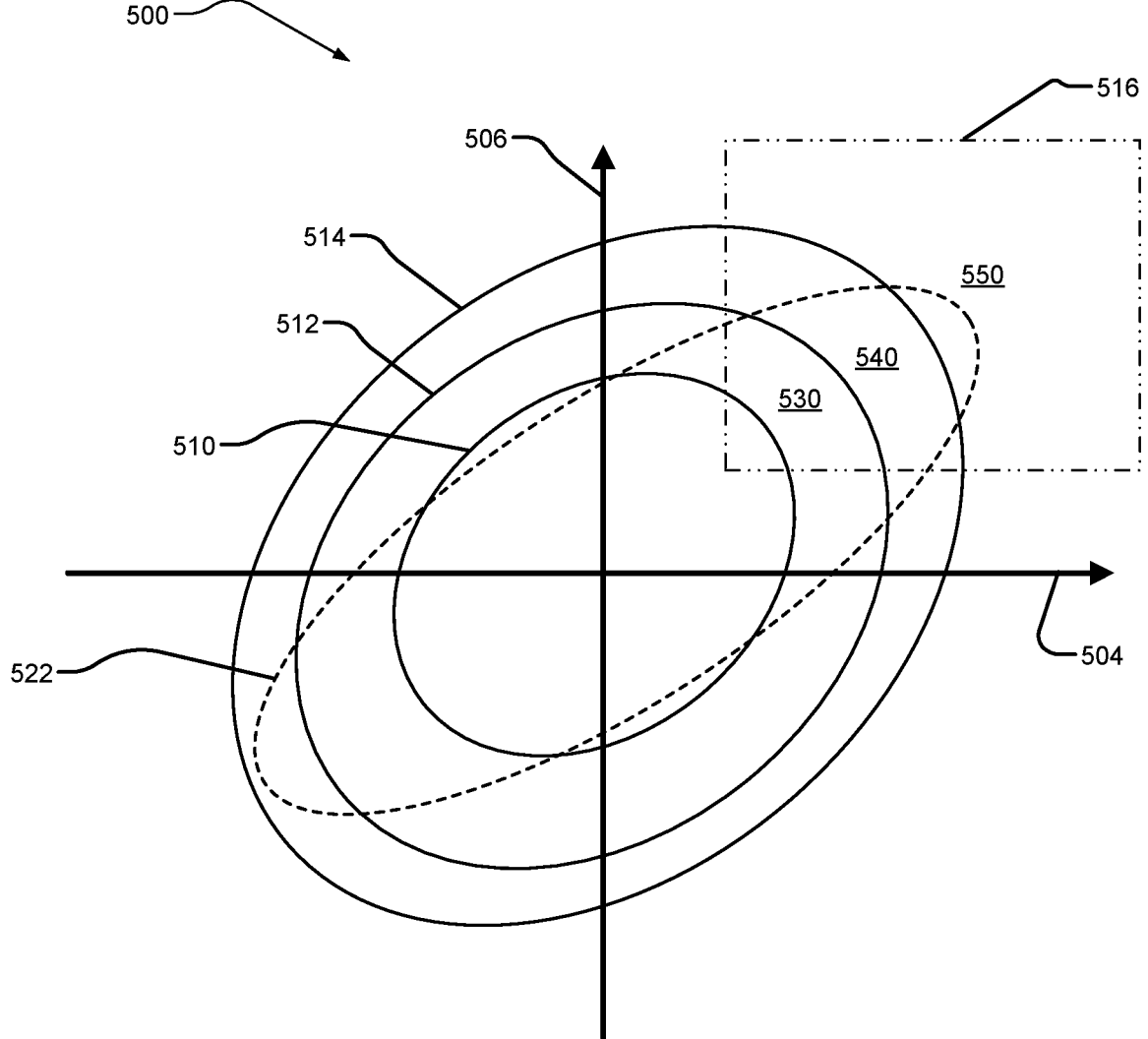
FIG. 5 depicts a graph showing bounded regions in a torque domain having a torque axis and a torque rate axis, where the bounded regions correspond to different confidence levels according to the present disclosure.

Additionally, the control module 102 may determine and assign a confidence level for the directional steering intent of the driver based on one more defined thresholds. In some embodiments, the defined thresholds may correspond to bounded regions. For example, one bounded region may be defined by two thresholds (e.g., a low threshold and a medium threshold), another bounded region may be defined by two thresholds (e.g., the medium threshold and a high threshold), and yet another bounded region may be defined by one threshold (e.g., the high threshold). FIG. 5 illustrates a graph 500 depicting such bounded regions in a torque domain having a torque axis 504 (e.g., an X-axis) and a torque rate axis 506 (e.g., a Y-axis).

In FIG. 5, the graph 500 includes three ovals 510, 512, 514, a rotated ellipse 522 centered at the origin (0,0), and an evasive steer detection window 516 (e.g., similar to the evasive steer detection window 316 of FIG. 3). The ovals 510, 512, 514 and the evasive steer detection window 516 define bounded regions 530, 540, 550. For example, the bounded region 530 is defined by the evasive steer detection window 516 and portions of the ovals 510, 512, the bounded region 540 is defined by the evasive steer detection window 516 and portions of the ovals 512, 514 and the bounded region 550 is defined by the evasive steer detection window 516 and the oval 514.

The control module 102 of FIG. 1 can determine whether the modeled ellipse 522 with torque and corresponding torque rate values falls within one of the bounded regions 530, 540, 550. If so, the control module 102 can assign a confidence level associated with the directional steering intent of the driver. For instance, if the torque and corresponding torque rate values cause the modeled ellipse 522 to fall in the bounded region 530 (e.g., between the ovals 510, 512), the control module 102 assigns a low confidence level to the directional steering intent of the driver. If, however, the torque and corresponding torque rate values cause the modeled ellipse 522 to fall in the bounded region 540 (e.g., between the ovals 512, 514), the control module 102 assigns a medium confidence level to the directional steering intent of the driver. Alternatively, if the torque and corresponding torque rate values cause the modeled ellipse 522 to fall in the bounded region 550 (e.g., beyond the oval 514), the control module 102 assigns a high confidence level to the directional steering intent of the driver.

Equations (9), (10), and (11) below show relationships for assigning a low confidence level, a medium confidence level, a high confidence level, respectively, for the directional steering intent of the driver. In equations (9), (10), and (11), $C_1$ represents a low threshold, $C_2$ represents a medium threshold, and Cs represents a high threshold. In such examples, the thresholds $C_{21}$, $C_2$, $C_3$ may correspond to the ovals 510, 512, 514, respectively of FIG. 5.

$$C_2 \geq \frac{(\tau \cos \theta + \tau' \sin \theta)^2}{a^2} + \frac{(\tau \sin \theta - \tau' \cos \theta)^2}{b^2} \geq C_1 \qquad (9)$$

$$C_3 \geq \frac{(\tau \cos \theta + \tau' \sin \theta)^2}{a^2} + \frac{(\tau \sin \theta - \tau' \cos \theta)^2}{b^2} \geq C_2 \qquad (10)$$

$$\frac{(\tau \cos \theta + \tau' \sin \theta)^2}{a^2} + \frac{(\tau \sin \theta - \tau' \cos \theta)^2}{b^2} \geq C_3 \qquad (11)$$

With continued reference to FIG. 1, the control module 102 may generate and transmit one or more signals to the threat avoidance steering control module 106. In such examples, the signal(s) may indicate different conditions. For example, the control module 102 may provide an indication that an intent of the driver was detected, an indication of the actual directional steering intent of the driver, and/or the confidence level (e.g., low, medium, or high) associated with the directional steering intent. In various embodiments, the control module 102 may additionally and/or alternatively indicate a value associated with the confidence level. For instance, if the comparison between the left and right (e.g., weighted) evasive steering maneuver probabilities signify that the directional steering intent is the right with a high confidence level, the control module 102 may transmit a signal indicating the directional steering intent is to the right with a high confidence level. Alternatively, if the comparison between the left and right (e.g., weighted) evasive steering maneuver probabilities signify that the directional steering intent is the left with a low confidence level, the control module 102 may transmit a signal indicating the directional steering intent is to the left with a low confidence.

Then, the threat avoidance steering control module 106 may control the vehicle based on the signal(s) if desired. For example, the threat avoidance steering control module 106 may analyze the received data (e.g., the intent of the driver was detected, the actual directional steering intent of the driver, and/or the confidence level) along with other data received from the detection module 108, and provide a signal 116 for controlling automated evasive steering in the vehicle. In some examples, the threat avoidance steering control module 106 may disregard or give less weight to the actual directional steering intent of the driver if the confidence level is below a threshold (e.g., a low confidence level or a representative value thereof).

Figure 6:
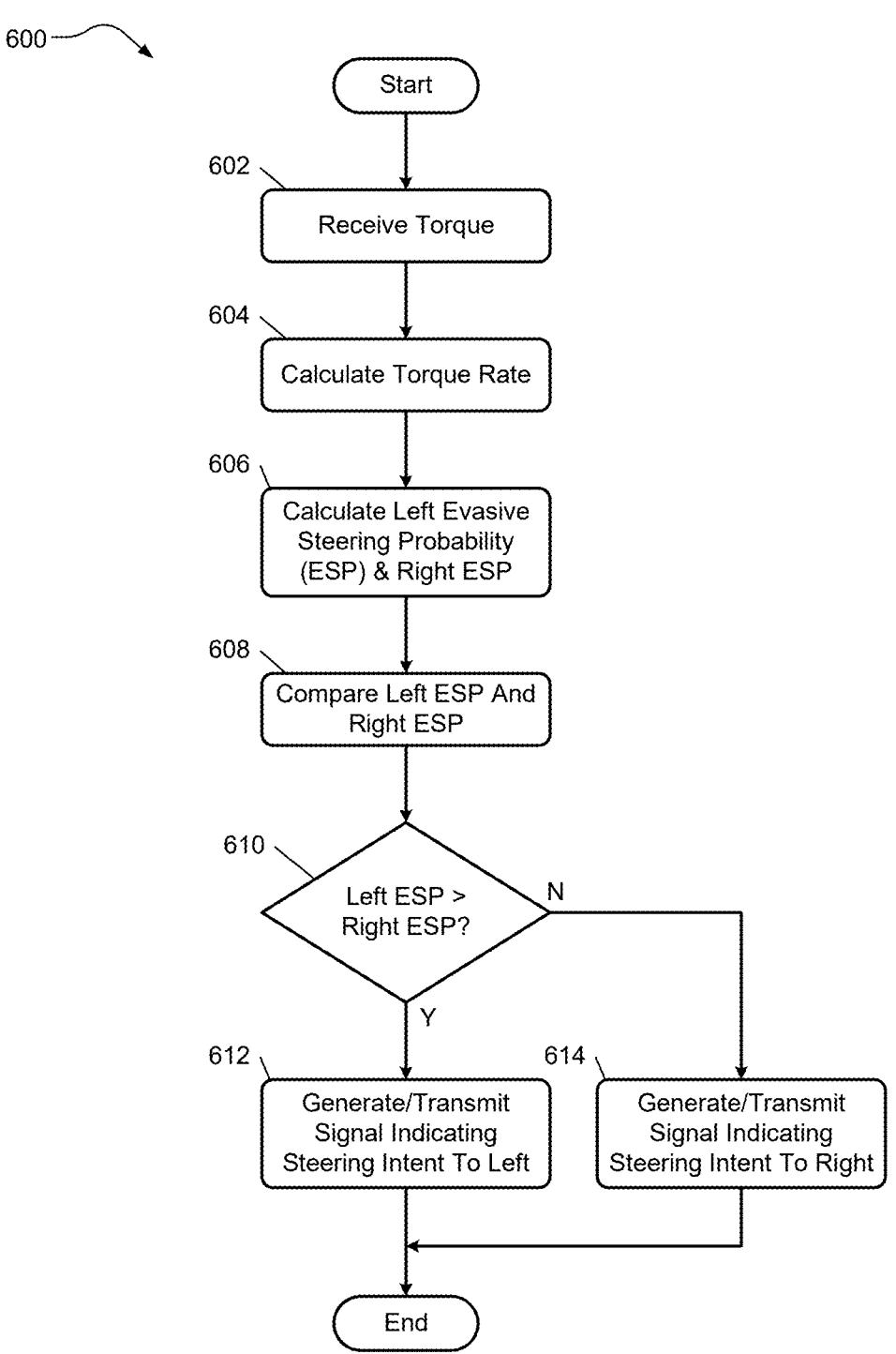
FIGS. 6-7 are flowcharts of example control processes for detecting and predicting driver intent in evasive steering maneuvers, according to the present disclosure.
Figure 7:
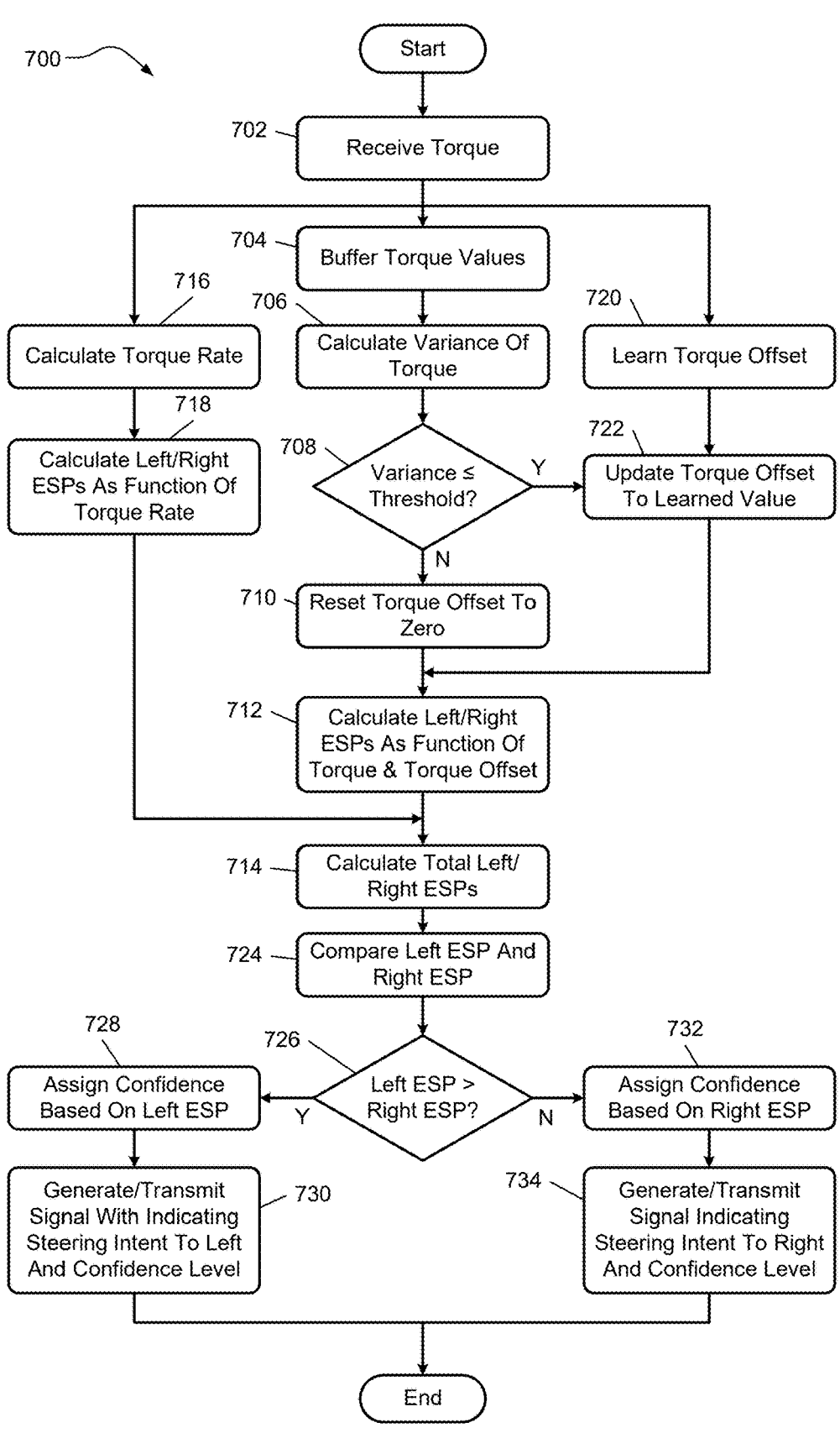

FIGS. 6-7 illustrate example control processes 600, 700 employable by the vehicle system 100 of FIG. 1 for detecting and predicting driver intent in evasive steering maneuvers in a moving vehicle (e.g., the vehicle 200 of FIG. 2). Although the example control processes 600, 700 are described in relation to the vehicle system 100 of FIG. 1 including the control module 102, any one of the control processes 600, 700 may be employable by any suitable system.

In FIG. 6, the control process 600 begins at 602, where the control module 102 receives torque data indicating movement of a steering wheel in the vehicle. In various embodiments, the control module 102 may receive multiple torque values (or representations thereof) over time from a sensor (e.g., the steering sensor 104) indicative of the torque applied to the steering wheel. Control then proceeds to 604.

At 604, the control module 102 calculates or otherwise determines a torque rate associated with the received torque. The control module 102 may determine the torque rate by calculating the derivative of the torque, as explained herein. Control then proceeds to 606.

At 606, the control module 102 calculates a left evasive steering maneuver probability and a right evasive steering maneuver probability. In such examples, the control module 102 may determine the evasive steering maneuver probabilities according to equations (5)-(7) above. In various examples, the evasive steering maneuver probabilities may be weighted according to equation (8) above. Control then proceeds to 608, 610.

At 608, the control module 102 compares the left evasive steering maneuver probability and the right evasive steering maneuver probability. At 610, the control module 102 determines which one of the evasive steering maneuver probabilities is greatest. For example, in 610, the control module 102 may determine whether the left evasive steering maneuver probability is greater than the right evasive steering maneuver probability. If yes at 610, control proceeds to 612 where the control module 102 generates and transmits a signal to an threat avoidance steering control module (e.g., the threat avoidance steering control module 106 of FIG. 1) indicating the directional steering intent of the driver is to the left. However, if no at 610 (e.g., the right evasive steering maneuver probability is greater than the left evasive steering maneuver probability), control proceeds to 614 where the control module 102 generates and transmits a signal to the threat avoidance steering control module indicating the directional steering intent of the driver is to the right. Control may then end as shown in FIG. 6 or return to 602.

In FIG. 7, the control process 700 begins at 702, where the control module 102 receives torque data indicating movement of a steering wheel in the vehicle, as explained above. Control then proceeds to 704, 716, 720.

At 704, the control module 102 buffers multiple values of the received torque. Control then proceeds to 706, 708. The control module 102 calculates a variance based on the buffered torque values at 706, and determines whether the calculated variance is less than or equal to a defined threshold at 708. If yes at 708, control proceeds to 722. If no at 708, control proceeds to 710.

At 716, the control module 102 calculates or otherwise determines a torque rate associated with the received torque, as explained herein. Control then proceeds to 718. The control module 102 calculates both left and right evasive steering maneuver probabilities as a function of the calculated torque rate at 718. In various embodiments, the control module 102 may implement equation (6) above to calculate the evasive steering maneuver probabilities as a function of the calculated torque rate. Control then proceeds to 714.

At 720, the control module 102 learns a torque offset value for translating a modeled rotated ellipse to an origin (0,0) in a torque domain, as explained herein. For example, the control module 102 may employ a filter (e.g., a Stochastic filter, etc.) that averages values over time to learn a torque offset value. Control then proceeds to 722.

At 722, the control module 102 updates or otherwise sets the torque offset value to the learned value as explained herein. As such, if the calculated variance is less than or equal to the defined threshold at 708, the learned value at 720 is used for the torque offset. Control then proceeds to 712.

At 710, the control module 102 sets (or resets) the torque offset value for translating the modeled rotated ellipse to the origin (0,0) in the torque domain to zero. As such, if the calculated variance is greater than to the defined threshold at 708, the torque offset is set (or reset) to zero. Control then proceeds to 712.

At 712, the control module 102 calculates both left and right evasive steering maneuver probabilities as a function of the torque and the torque offset value. In various embodiments, the control module 102 may implement equation (5) above to calculate the evasive steering maneuver probabilities as a function of the torque and the torque offset value. Control then proceeds to 714.

At 714, the control module 102 calculates a combined left evasive steering maneuver probability and a combined right evasive steering maneuver probability. For example, the control module 102 may implement equation (7) above to calculate the combined evasive steering maneuver probabilities. In various examples, the evasive steering maneuver probabilities may be weighted according to equation (8) above. Control then proceeds to 724, 726.

At 724, the control module 102 compares the combined left evasive steering maneuver probability and the combined right evasive steering maneuver probability. At 726, the control module 102 determines which one of the evasive steering maneuver probabilities is greatest, as explained above. If the combined left evasive steering maneuver probability is greater than the combined right evasive steering maneuver probability at 726, control proceeds to 728. Otherwise, if the combined left evasive steering maneuver probability is less than the combined right evasive steering maneuver probability at 726, control proceeds to 732.

At 728, the control module 102 assigns a confidence level to the combined left evasive steering maneuver probability. In various embodiments, the control module 102 may implement equations (9)-(11) above to assign the confidence level. For example, if the model relationship falls within a first range (e.g., within a low threshold and a medium threshold), the control module 102 may assign a low confidence level. If, however, the model relationship falls within a second range (e.g., within the medium threshold and a high threshold), the control module 102 may assign a medium confidence level. If the model relationship falls within a third range (e.g., above the high threshold), the control module 102 may assign a high confidence level. Control then proceeds to 730 where the control module 102 generates and transmits a signal to an threat avoidance steering control module (e.g., the threat avoidance steering control module 106 of FIG. 1) indicating the directional steering intent of the driver is to the left and the assigned confidence level. Control may then end as shown in FIG. 7 or return to 702.

At 732, the control module assigns a confidence level to the combined right evasive steering maneuver probability, such as by implementing equations (9)-(11) as explained above. Control then proceeds to 734 where the control module 102 generates and transmits a signal to the threat avoidance steering control module indicating the directional steering intent of the driver is to the right and the assigned confidence level. Control may then end as shown in FIG. 7 or return to 702.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for predicting a directional steering intent of a driver in evasive steering maneuvers, the vehicle system comprising:
   a sensor configured to monitor a torque applied to a steering wheel in a vehicle; and
   a control module in communication with the sensor, the control module configured to:
      receive data from the sensor indicative of the torque applied to the steering wheel while the vehicle is moving;
      calculate a torque rate based on the torque applied to the steering wheel;
      calculate a first left evasive steering probability of the driver intending to steer the vehicle to the left based on the torque rate;
      calculate a second left evasive steering probability of the driver intending to steer the vehicle to the left based on the torque applied to the steering wheel and a modeled relationship between the torque applied to the steering wheel and the torque rate;
      calculate a first right evasive steering probability of the driver intending to steer the vehicle to the right based on the torque rate;
      calculate a second right evasive steering probability of the driver intending to steer the vehicle to the right based on the torque applied to the steering wheel and the modeled relationship between the torque applied to the steering wheel and the torque rate;
      combine the first left evasive steering probability and the second left evasive steering probability into a combined left evasive steering probability;
      combine the first right evasive steering probability and the second right evasive steering probability into a combined right evasive steering probability;
      compare the combined left evasive steering probability and the combined right evasive steering probability to determine the directional steering intent of the driver; and
      transmit a signal indicating the directional steering intent of the driver from the control module to a threat avoidance steering module to control at least one evasive steering maneuver of the vehicle.

2. The vehicle system of claim 1, wherein:
the modeled relationship is a rotated ellipse; and
the control module is configured to determine a torque offset for the modeled relationship to center the rotated ellipse at a defined point.

3. The vehicle system of claim 2, wherein the control module is configured to:
   calculate a variance of the torque applied to the steering wheel; and
   in response to the variance being less than or equal to a defined threshold, set the torque offset to a learned value.

4. The vehicle system of claim 2, wherein the control module is configured to:
   calculate a variance of the torque applied to the steering wheel; and
   in response to the variance being greater than a defined threshold, set the torque offset to zero.

5. The vehicle system of claim 1, wherein the control module is configured to:

in response to the combined left evasive steering probability being greater than the combined right evasive steering probability, transmit the signal to the threat avoidance steering module indicating the directional steering intent of the driver is to the left; and
   in response to the combined right evasive steering probability being greater than the combined left evasive steering probability, transmit the signal to the threat avoidance steering module indicating the directional steering intent of the driver is to the right.

6. The vehicle system of claim 5, wherein the combined left evasive steering probability and the combined right evasive steering probability are based on weighted averages of the torque applied to the steering wheel and the torque rate.

7. The vehicle system of claim 6, wherein the control module is configured to assign a confidence level for the directional steering intent of the driver based on one or more defined thresholds.

8. The vehicle system of claim 7, wherein the control module is configured to transmit the signal to the threat avoidance steering module indicating the assigned confidence level for the directional steering intent of the driver.

9. A vehicle comprising the vehicle system of claim 1.

10. A method for predicting a directional steering intent of a driver in evasive steering maneuvers, the method comprising:
   receiving data indicative of a torque applied to a steering wheel in a vehicle while the vehicle is moving;
   calculating a torque rate based on the torque applied to the steering wheel;
   calculating a first left evasive steering probability of the driver intending to steer the vehicle to the left based on the torque rate;
   calculating a second left evasive steering probability of the driver intending to steer the vehicle to the left based on the torque applied to the steering wheel and a modeled relationship between the torque applied to the steering wheel and the torque rate;
   calculating a first right evasive steering probability of the driver intending to steer the vehicle to the right based on the torque rate;
   calculating a second right evasive steering probability of the driver intending to steer the vehicle to the right based on the torque applied to the steering wheel and the modeled relationship between the torque applied to the steering wheel and the torque rate;
   combining the first left evasive steering probability and the second left evasive steering probability into a combined left evasive steering probability;
   combining the first right evasive steering probability and the second right evasive steering probability into a combined right evasive steering probability;
   comparing the combined left evasive steering probability and the combined right evasive steering probability to determine the directional steering intent of the driver; and
   transmitting a signal indicating the directional steering intent of the driver from a control module to a threat avoidance steering module to control at least one evasive maneuver of the vehicle.

11. The method of claim 10, wherein:
the modeled relationship is a rotated ellipse; and
the method further comprises determining a torque offset for the modeled relationship to center the rotated ellipse at a defined point.

12. The method of claim 11, further comprising:

calculating a variance of the torque applied to the steering wheel; and in response to the variance being less than or equal to a defined threshold, setting the torque offset to a learned value.

13. The method of claim 11, further comprising:

calculating a variance of the torque applied to the steering wheel; and in response to the variance being greater than a defined threshold, setting the torque offset to zero.

14. The method of claim 10, wherein transmitting the signal to the threat avoidance steering module includes transmitting the signal to the threat avoidance steering module indicating the directional steering intent of the driver is to the left in response to the combined left evasive steering probability being greater than the combined right evasive steering probability.

15. The method of claim 10, wherein transmitting the signal to the threat avoidance steering module includes transmitting the signal to the threat avoidance steering module indicating the directional steering intent of the driver is to the right in response to the combined right evasive steering probability being greater than the combined left evasive steering probability.

16. The method of claim 10, wherein the combined left evasive steering probability and the combined right evasive steering probability are based on weighted averages of the torque applied to the steering wheel and the torque rate.

17. The method of claim 10, further comprising assigning a confidence level for the directional steering intent of the driver based on the combined left evasive steering probability or the combined right evasive steering probability and one or more defined thresholds.

18. The method of claim 17, wherein transmitting the signal to the threat avoidance steering module includes transmitting the signal to the threat avoidance steering module indicating the assigned confidence level for the directional steering intent of the driver.

19. A vehicle system for predicting a directional steering intent of a driver in evasive steering maneuvers, the vehicle system comprising:

a sensor configured to monitor a torque applied to a steering wheel in a vehicle; and a control module in communication with the sensor, the control module configured to:

receive data from the sensor indicative of the torque applied to the steering wheel while the vehicle is moving;

calculate a torque rate based on the torque applied to the steering wheel;

calculate a first left evasive steering probability of the driver intending to steer the vehicle to the left based on the torque rate;

calculate a second left evasive steering probability of the driver intending to steer the vehicle to the left based on the torque applied to the steering wheel and a modeled relationship between the torque applied to the steering wheel and the torque rate;

calculate a first right evasive steering probability of the driver intending to steer the vehicle to the right based on the torque rate;

calculate a second right evasive steering probability of the driver intending to steer the vehicle to the right based on the torque applied to the steering wheel and the modeled relationship between the torque applied to the steering wheel and the torque rate;

combine the first left evasive steering probability and the second left evasive steering probability into a combined left evasive steering probability;

combine the first right evasive steering probability and the second right evasive steering probability into a combined right evasive steering probability;

compare the combined left evasive steering probability and the combined right evasive steering probability to determine the directional steering intent of the driver;

assign a confidence level for the directional steering intent of the driver based on the combined left evasive steering probability or the combined right evasive steering probability and one or more defined thresholds; and transmit a signal indicating the directional steering intent of the driver and the assigned confidence level from the control module to a threat avoidance steering module to control at least one evasive steering maneuver of the vehicle.

20. The vehicle system of claim 19, wherein:

the modeled relationship is a rotated ellipse; and the control module is configured to determine a torque offset for the modeled relationship to center the rotated ellipse at a defined point.

* * * * *